(12) United States Patent
Lacaze

(10) Patent No.: US 7,342,341 B2
(45) Date of Patent: Mar. 11, 2008

(54) ROTOR FOR ELECTRICAL ROTATING MACHINES

(75) Inventor: Alain Lacaze, Essert (FR)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 11/058,583

(22) Filed: Feb. 15, 2005

(65) Prior Publication Data

US 2005/0184614 A1    Aug. 25, 2005

Related U.S. Application Data

(63) Continuation of application No. PCT/CH03/00521, filed on Jul. 30, 2003.

(30) Foreign Application Priority Data

Aug. 16, 2002  (CH)  ................................. 1408/02

(51) Int. Cl.
*H02K 9/00* (2006.01)
*H02K 1/00* (2006.01)

(52) U.S. Cl. .................. 310/201; 310/58; 310/261
(58) Field of Classification Search ............ 310/52–59, 310/216–218, 201–208, 261–262
See application file for complete search history.

(56) References Cited

U.S. PATENT DOCUMENTS

| | | | | |
|---|---|---|---|---|
| 2,167,355 A | * | 7/1939 | Gay | 310/262 |
| 2,781,465 A | * | 2/1957 | Schuff | 310/211 |
| 3,599,021 A | | 8/1971 | Guimbal | 310/61 |
| 3,894,253 A | * | 7/1975 | Willyoung | 310/61 |
| 4,146,809 A | | 3/1979 | Rielly | 310/261 |
| 4,333,027 A | | 6/1982 | Madsen | 310/61 |
| 4,363,986 A | | 12/1982 | Joho et al. | 310/214 |
| 4,644,210 A | * | 2/1987 | Meisner et al. | 310/211 |
| 4,885,494 A | * | 12/1989 | Higashi | 505/166 |
| 5,030,871 A | * | 7/1991 | Shah et al. | 310/261 |
| 5,300,847 A | * | 4/1994 | Haditsch | 310/61 |

FOREIGN PATENT DOCUMENTS

| | | |
|---|---|---|
| CH | 638 349 | 9/1983 |
| CH | 649 422 | 5/1985 |
| DE | 570 762 | 2/1933 |
| EP | 0 079 584 | 5/1983 |
| FR | 2 239 036 | 2/1975 |
| FR | 2 518 841 | 6/1983 |
| FR | 2 594 271 | 8/1987 |
| JP | 3-261340 | 11/1991 |

OTHER PUBLICATIONS

International Search Report, International Application No. PCT/CH 03/00521, European Patent Office, Sep. 29, 2003.
Search Report for Application No. CH 14082002, European Patent Office, Nov. 25, 2002.

* cited by examiner

*Primary Examiner*—Thanh Lam
(74) *Attorney, Agent, or Firm*—Darby & Darby

(57) ABSTRACT

A rotor for electrical rotating machines includes a rotor core with axial grooves for receiving axial conductors. A first element on the axial grooves and a corresponding second element on the axial conductors interact with one another to fix the axial conductors in the axial grooves in particular with respect to centrifugal and torsional forces. The provision of structural features on the rotor in the grooves and corresponding features on the conductors allows a simple and direct assembly of the conductors to the rotor core without additional fixing means. A method of assembling such a rotor is also provided.

23 Claims, 7 Drawing Sheets

ROTOR FOR ELECTRICAL ROTATING MACHINES

This patent application is a continuation of International Patent Application No. PCT/CH2003/000521, having an international filing date of Jul. 30, 2003, and which claims priority to Swiss Patent Application No. CH 1408/02, filed on Aug. 16, 2002. The entire disclosure of both applications is incorporated by reference herein.

The present invention relates to a rotor for electrical rotating machines comprising a rotor core with axial grooves for taking up conductors. It additionally relates to a method for assembling such a rotor.

BACKGROUND

The rotating field of an electrical rotating machine is generated by a rotor core with grooves into which turns of electrical conductors are embedded. Usually the rotor core is made of steel while the turns are made of copper or another electrically conducting material. The field is generated by feeding these turns by a direct current which is either generated separately and then contacted to the conductors via brushes on the shaft of the rotor, or which is generated directly on the shaft using an exciter in so-called brushless excitation.

Due to the high centrifugal forces which have to be supported by the rotors and its components, it is of primordial importance to fix the conductors firmly to the rotor core and at the same time, due to the heat generated in the conductors, it is important to allow efficient cooling of these conductors.

Usually this is achieved by providing slots, the conductors are put into these slots from a radial direction, and subsequently, on the radially outward, peripheral sides of the slots, these are closed and at the same time the conductors are fixed with respect to centrifugal forces by the use of wedges or rings. The stack of conductors is thus kept in radial direction by these wedges or rings. Cooling of such arrangements is achieved by either leaving slots between the conductors and the sidewalls of the grooves or by providing axial and/or radial holes in the conductors or between the conductors and by circulating cooling gas through these cavities. Such an arrangement is for example described in CH 638349 or in CH 649422.

SUMMARY OF THE INVENTION

An object of the present invention is to provide an alternative, simple and reliable construction of rotors providing securely fixed conductors of the turns at high generated fields. This for a rotor for electrical rotating machines comprising a rotor core with recesses between poles for taking up axial conductors.

The present invention provides a first element in grooves in the recesses and a corresponding second element on the axial conductors, wherein the first element and the second element interact to fix the axial conductors in the axial grooves in particular with respect to centrifugal and torsional forces.

Specifically, the present invention provides a rotor for electrical rotating machines that includes a rotor core with axial grooves for taking up conductors, characterised in that the axial grooves are shaped with a first element and in that the axial conductors are shaped with a corresponding second element, wherein the first element and the second element interact to fix the axial conductors in the axial grooves in particular with respect to centrifugal and torsional forces. In addition, the present invention provides a method of assembling a rotor having a plurality of axial conductors and a rotor core having a plurality of axial grooves configured to receive the plurality of axial conductors. The method includes shifting one of the plurality of axial conductors into one of the plurality of axial grooves in an axial direction of the rotor. In addition, the present invention provides a process for assembling a rotor, characterised in that alternately single solid axial conductors and end connections are stepwise shifted into the rotor core into the axial grooves from an axial direction of the rotor, wherein the axial conductors and the end connections are after each step conductively connected with each other to successively form turns around conductor free portions of the rotor, and wherein, if need be, on the radially outward side of the axial conductors a third element is shifted between adjacent axial conductors from an axial direction of the rotor to keep the axial conductors at a predetermined distance and to stabilize the axial conductors in a circumferential direction.

A key feature of the invention includes the fact that, instead of just putting the conductors into slots in the rotor core, the recesses are structured by said grooves within which a first element is provided to therewith directly fix each axial conductor. To allow this, the conductors are also correspondingly structured by a second element, which by interacting with the first element allows direct fixing of the conductors in the grooves. While according to the state-of-the-art, the conductors are usually fixed in the slots by using particular wedges or rings which are inserted on top (peripheral side) of the conductors, and which wedges/rings therefore bear the whole centrifugal load generated by the conductors, in this case the centrifugal load generated during operation of the rotor is directly taken by the interaction of the first element with the second element. Thus no additional parts like wedges or rings are necessary thus reducing costs, and additionally, due to the direct fixation of the conductors to the rotor core, a simple, sturdy construction which is easy to assemble and maintain can be provided. Additionally, the conductors will be of larger cross-section than conventional, allowing low voltage rated insulation. Insulation between adjacent conductors located in adjacent grooves can be provided by an air gap/slot, through which cooling air is fed.

In a first preferred embodiment of the present invention, the first element takes the form of shoulders provided in the grooves. The shoulders at least have a surface allowing abutment of the second element in radial direction, thus providing a direct possibility for taking up the centrifugal forces acting on the conductors. Preferably, these shoulders are extending substantially along the whole axial grooves (preferably providing surfaces tangential to the axis of the shaft), and are preferentially located symmetrically on both sides of the grooves. Accordingly, the second element is shaped to interact with these shoulders in the grooves. The second element is shaped as corresponding recesses (or shoulders) in the axial conductors, which themselves abut on said shoulders of the grooves. Preferably these recesses are extending substantially along the whole axial conductors, and are preferentially located symmetrically on both sides of the axial conductors. A particularly simple construction is possible, if the first element and the second element are located close to the shaft, i.e. close to the bottom of the recesses between the pole zones. This is for example possible, if, as preferred, the recesses of the conductors are located in the radial inner region (with respect to the rotor) of the axial conductors, and correspondingly the shoulders on the grooves are located close to the bottom of the recesses of the rotor, i.e. close to the axis of the rotor. The axial conductors may then protrude significantly out of the grooves into the recesses (free-standing conductors) and extend flush with the diameter corresponding to the rotor pole surfaces. Between adjacent conductors located in adjacent grooves there remains gaps in the peripheral, protruding section of the conductors.

Another preferred embodiment of the present invention is characterised in that the axial grooves are shaped as dove-tail grooves in the rotor core (T-shaped or V-shaped or the like) and in that the axial conductors comprise a corresponding dove-tail portion (i.e. correspondingly also T-shaped or V-shaped or the like) fitting into said dove-tail grooves. In particular T-shaped grooves, i.e. grooves with two symmetrical shoulders on each side are easy to machine into the shaft forging and allow good and tight fixing of the conductors. The corresponding T-shape on the axial conductors can also be easily machined or extended drawn.

A particularly easy preferred embodiment is characterised in that one single axial conductor is located in one axial groove (according to the state-of-the-art usually several conductors are taken up by one groove), and in that preferentially the radial height of the axial conductor (i.e. in the radial direction) is substantially larger than its circumferential width (which essentially corresponds to the width of the groove, at least in the bottom part). Preferentially the axial conductors have a trapezoidal shape, i.e. the width on the radially inward side of the axial conductor is smaller than the width on the radially outward side of the axial conductor. One conductor is then only provided in radial direction for a given angular position of the rotor.

Another particularly easy construction of a rotor according to the invention allows the axial conductors to shift into the grooves from an axial direction of the rotor. In particular if the first element as well as the second element extend along the whole groove and conductor, respectively, this on the one hand allows tight and immediate contact between the rotor core and the conductors, and it at the same time allows easy manufacturing or assembling.

A further preferred embodiment of the present invention is characterised in that the depth of the axial grooves is substantially smaller than the free-standing radial height of the axial conductors, i.e. that the axial conductors project out of the grooves in the rotor core in the regions where there is the recesses for the conductors. Preferentially, these protruding portions of the axial conductors, between which there remains a deep clearance (providing electrical insulation and allowing circulation of cooling air) in such a situation, are fixed relative to each other and also relative to the poles of the rotor core, where there are no conductors. This is achieved by providing on the radially outward side between the axial conductors a third element between adjacent axial conductors to keep them at a predetermined distance and to stabilize the conductors in a circumferential direction.

Preferably, these third element take the form of wedges or bars, which interact with recesses provided in the axial conductors, wherein preferentially the wedges extend substantially along the length of the axial conductors, such that between the rotor core and the wedges there remain axial channels for the circulation of cooling air. Optionally, the wedges additionally comprise radial bores or are locally omitted for allowing partial circulation of cooling air in radial direction. Such a construction allows a particularly efficient cooling of the rotor.

With respect to the material out of which the axial conductors and their end-connections are made, aluminium or copper, or alloys basing on at least one of these metals, are possible. Preferably, one single axial conductor is located in one axial groove, wherein one single axial conductor has a cross-section in the range of 1000 to 4500 mm$^2$, preferentially in the range of 2000 to 4000 mm$^2$.

In another preferred embodiment of the present invention, there are conductor free portions on the rotor (pole zones) around which the conductors for the generation of the field are wound in at least one turn, wherein the axial parts of the turns are formed by said axial conductors located in said axial grooves, and wherein the circumferential parts of the turns are formed by at least one end connection (usually taking the form of a ring segment) provided on the shaft ends exterior to the pole zones, i.e. adjacent to these. The at least one end connection is also provided with a second element to interact with the first element to fix the end connections in the axial grooves in particular with respect to centrifugal and torsional forces. The grooves in the rotor core are longer than the axial conductors thus allowing the end connections to be fixed also in these grooves by means of the shoulders provided in the grooves. Fixing the end connections in an analogous manner as fixing the axial conductors has the advantage that displacements of the conductors (axial conductors as well as end connections) due to rotational or torsional forces are similar for the axial conductors as well as for the end connections. Thus, stress on the connections between the end connections and the axial conductors is avoided. To improve the stabilisation of these end connections, it is possible to provide additional axial grooves with a first element on the shaft end regions exterior to the pole zones, wherein a correspondingly additional second element is provided on the at least one end connection. Preferably, the first element takes the form of shoulders as described above, which are arranged preferentially symmetrically on both sides of the grooves. Accordingly, the second element takes the form of corresponding recesses in protrusions in the end connections (on the shaft side of the ring segment) extending perpendicularly to the main direction of the end connections.

A particularly simple construction also of the end connections is possible, if these end connections are single conductors with the same height as the single (per groove) axial conductors, wherein preferably the radial height of the end connections is substantially larger than its axial width. If there is just one turn, only one end connection is necessary on each side of the pole zones, if several turns are provided, the end connections are parallel to each other and perpendicular to the main axis of the shaft.

According to another preferred embodiment of the present invention, the end connections are conductively connected to the axial conductors by means of pins or bolts. The connection alternatively may be welded, brazed or glued, preferentially by means of a conducting glue. Combinations of the above mentioned connection means are usable as well. For example a combination of pins or bolts and a conducting glue can provide a particularly simple and reliable connection between the end connections and the axial conductors.

Preferably, not only the axial conductors can be shifted into the rotor core from the axial direction, but also the end connections can be shifted into the rotor core into the axial grooves from an axial direction of the rotor.

Further preferred embodiments of the present rotor according to the invention are outlined in the claims.

The present invention also relates to a process for assembling a rotor as described above. This process is characterised in that single solid axial conductors are shifted into the rotor core into the axial grooves from one end of the rotor.

This assembly is particularly simple and provides inherently a very stable connection between the rotor core and the conductors. The axial conductors can be additionally fixed in the grooves by using wedges or inflatable tubes that press the shoulders of the second element, provided on the axial conductors, onto the corresponding first element, i.e., e.g., also shoulders, provided on the grooves of the rotor core. This provides a preload against the centrifugal forces. Because of the small number of parts and as no particular tooling is necessary, such an assembly can also be easily carried out on-site with conductors and rotor core delivered separately on-site.

Another preferred embodiment of the process according to the invention is characterised in that alternately single solid axial conductors and end connections are stepwise shifted into the rotor core into the axial grooves from an axial direction of the rotor, wherein the axial conductors and the end connections are after each step conductively connected with each other to successively form turns around pole zones of the rotor. So stepwise first one axial conductor neighboring the pole zone of the rotor core is shifted into the corresponding groove, subsequently a corresponding end connection with an angular extension such that the end of the axial conductor abuts onto the inner surface of the end connection is shifted into the axial grooves from an axial direction. Subsequently, the axial conductor is electrically connected to the end connection, be it by pinning, brazing, welding (e.g. MIG, TIG, electron beam welding, laser welding, etc), gluing (conducting glue), screwing etc or combinations thereof. If need be, on the radially outward side of the axial conductors a third element is shifted between adjacent axial conductors from an axial direction of the rotor to keep the axial conductors at a predetermined distance and to stabilize the axial conductors in a circumferential direction.

Further embodiments of the process according to the present invention are outlined in the claims.

BRIEF DESCRIPTION OF THE DRAWINGS

Preferred embodiments of the invention are shown in the accompanying drawings, in which.

DETAILED DESCRIPTION OF THE PREFERRED EMBODIMENTS

Figure 1:
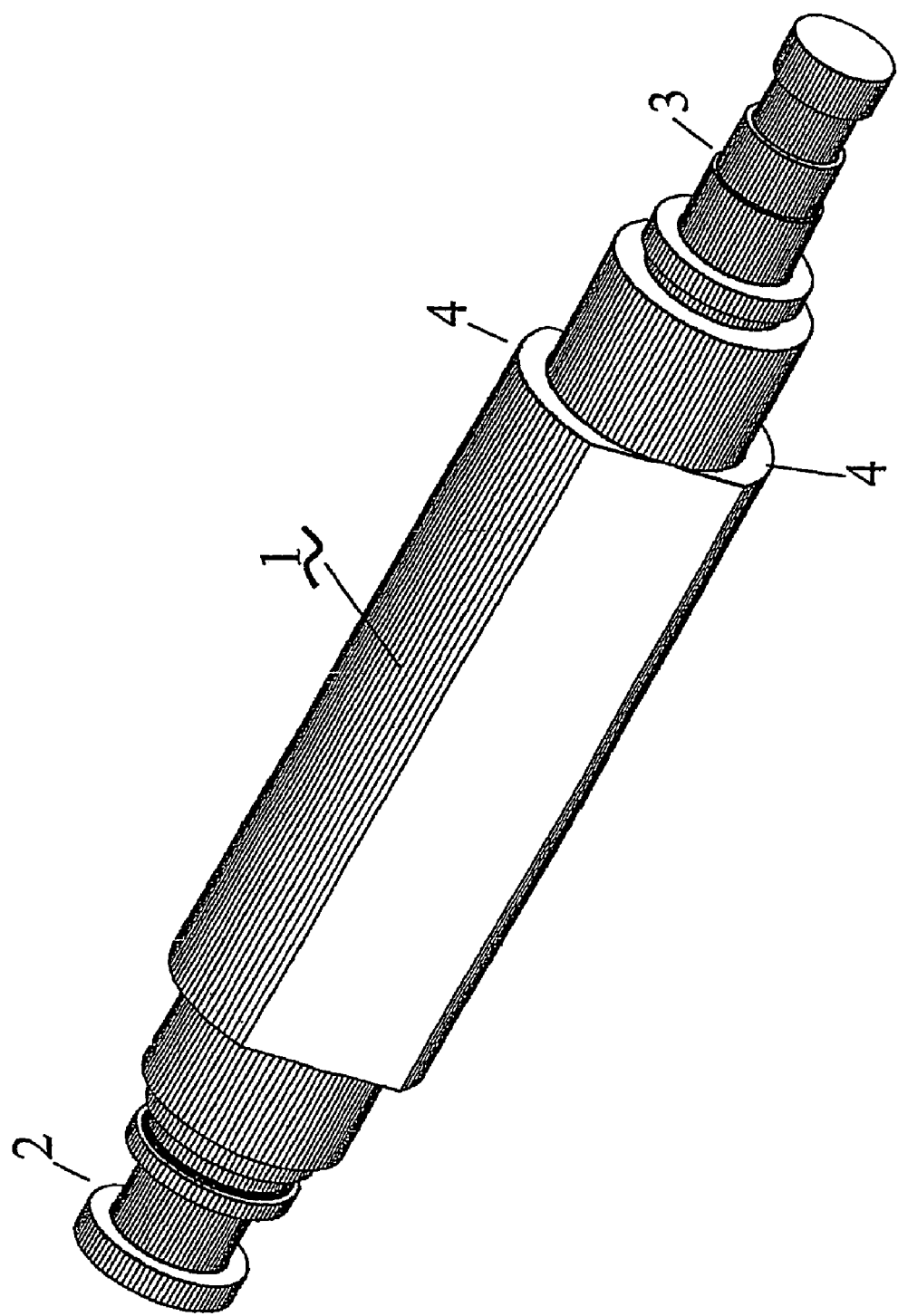
FIG. 1 shows a perspective view of a rotor forging.

Referring to the drawings, which are for the purpose of illustrating the present preferred embodiments of the invention and not for the purpose of limiting the same, FIG. 1 shows a perspective view of a forging shaft 1 of the rotor core which has not been machined yet, i.e. without grooves. One can already recognise the driven end 2, where there is the coupling flange to the turbine. On the other end of the shaft there is the so-called non driven end 3, where usually the exciter or the slip-rings are located. In the central region, one can already recognise the conductor free portions, or pole zones 4 of the rotor. The rotor core is made of steel.

Figure 2:
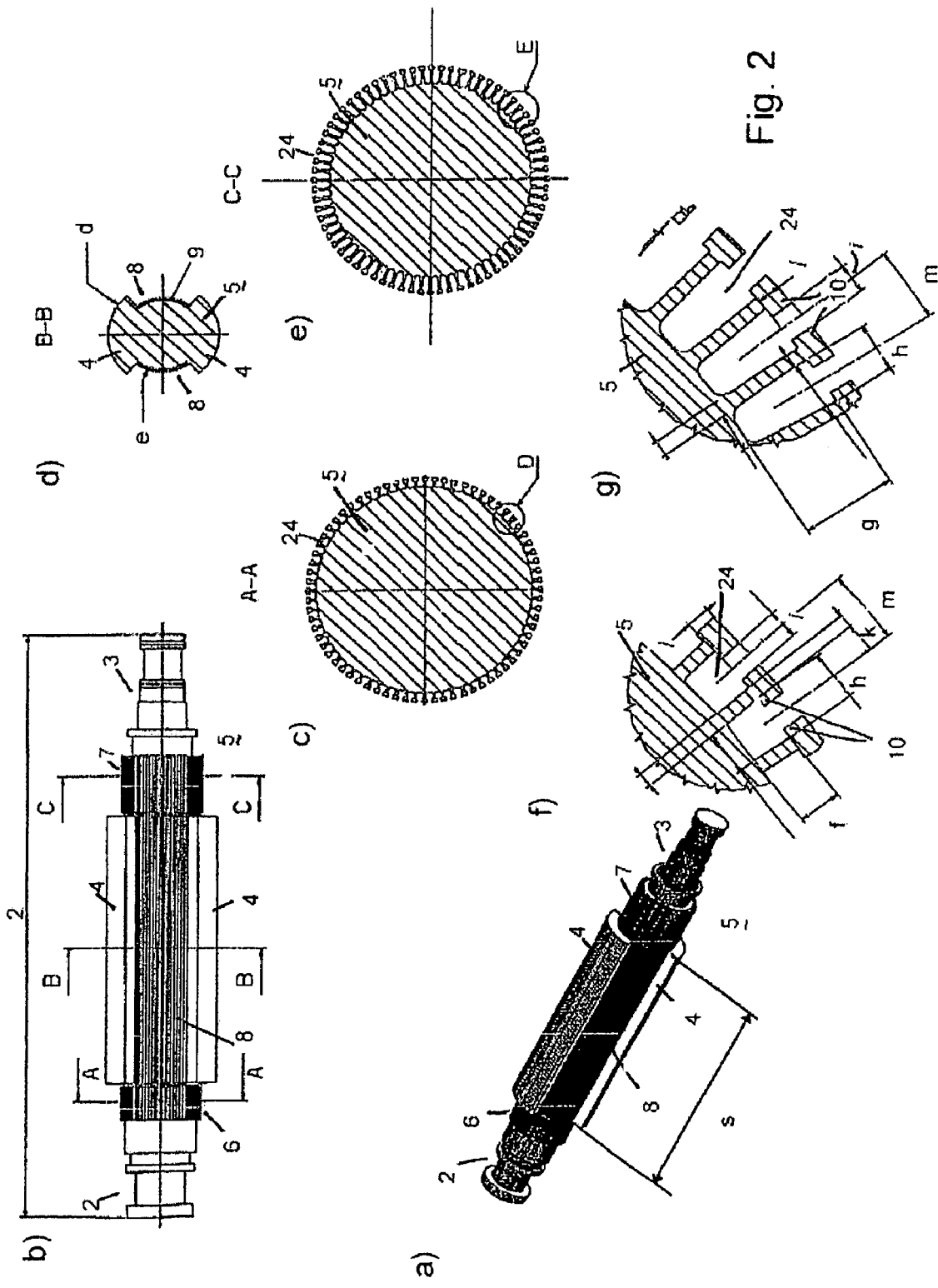
FIG. 2a) shows a perspective view of a machined rotor forging; b) shows a side view of the shaft core; c) shows a cut along the line A-A in FIG. 2b); d) shows a cut along the line B-B in FIG. 2b); e) shows a cut along the line C-C in FIG. 2b); f) shows a detail as indicated by D in FIG. 2c); g) shows a detail as indicated by E in FIG. 2e)

FIG. 2 shows the rotor core 5 after it has been machined properly. FIG. 2a) shows a perspective view of the rotor core 5, while FIG. 2b) shows a side view of such a rotor core 5. In the central part there are two pole zones 4, which are to be conductor free, and around which the turns of the conductors are to be wound. Depending on the number of poles, there might also be 4, 6 etc. of these conductor free regions 4. Between these conductor free regions 4 there are two recesses 8 where the axial conductors are to be located. Towards the end of the shaft right next to the conductor free region 4 there is the driven end terminal region 6 and the non driven end terminal region 7 for the end connections. The recesses 8 for the axial conductors as well as the terminal regions 6 and 7 are provided with axial grooves. The length a of the whole shaft is 5100 mm, the length s of the pole zones is approx. 2400 mm.

FIG. 2c) shows a cut along the line A-A in FIG. 2b), i.e. a cut orthogonal to the axis of the shaft through the driven end terminal region. The axial grooves which extend all along the central part of the rotor core, i.e. in the recesses 8 for the axial conductors as well as in the regions 6 and 7 are shaped as dove-tail-grooves. The shorter grooves 24 which only extend in the driven end terminal region 6 for the end connections have the same cross-section. FIG. 2f) shows the detail D as indicated in FIG. 2c). The grooves have a width h of 22 mm narrowing at the exit of the groove to a width i of 13 mm. Correspondingly, there are two symmetrical shoulders 10 on each side of the groove. The thickness 1 of these shoulders in radial direction is 10 mm. Between the grooves there is a wall of a width k of 5.9 mm, and every five degrees there is a groove, i.e. around the whole circumference there are 72 grooves.

FIG. 2d) shows a cut along the line B-B in FIG. 2b) orthogonal to the axis of the shaft. Here it can be seen that in the central region there are only grooves 9 in the recesses 8 for the axial conductors. The diameter e in the region of these recesses 8 is 660 mm, while in the conductor free region 4 it is 900 mm. FIG. 2e) shows a cut along the line C-C in FIG. 2b). The corresponding detail E is shown in FIG. 2g). In the non driven end terminal region 7 the grooves are deeper around the whole circumference of the shaft. This can be seen in FIG. 2g), where the depth g of the slot is 40 mm. Apart from the depth the slots have the same geometry as the one shown in FIG. 2f). The increased depth of the slots can be used for the connection of the innermost turn of the conductors (in particular of the innermost end connection) to the exciter, which is located on the non driven end 3 of the shaft. Additionally, deeper slots can be used for feeding cooling air in axial direction to the central part of the rotor core when the conductors are inserted in the slots. If this is intended, also the slots on the driven end 2 may be structured more deeply.

Figure 3:
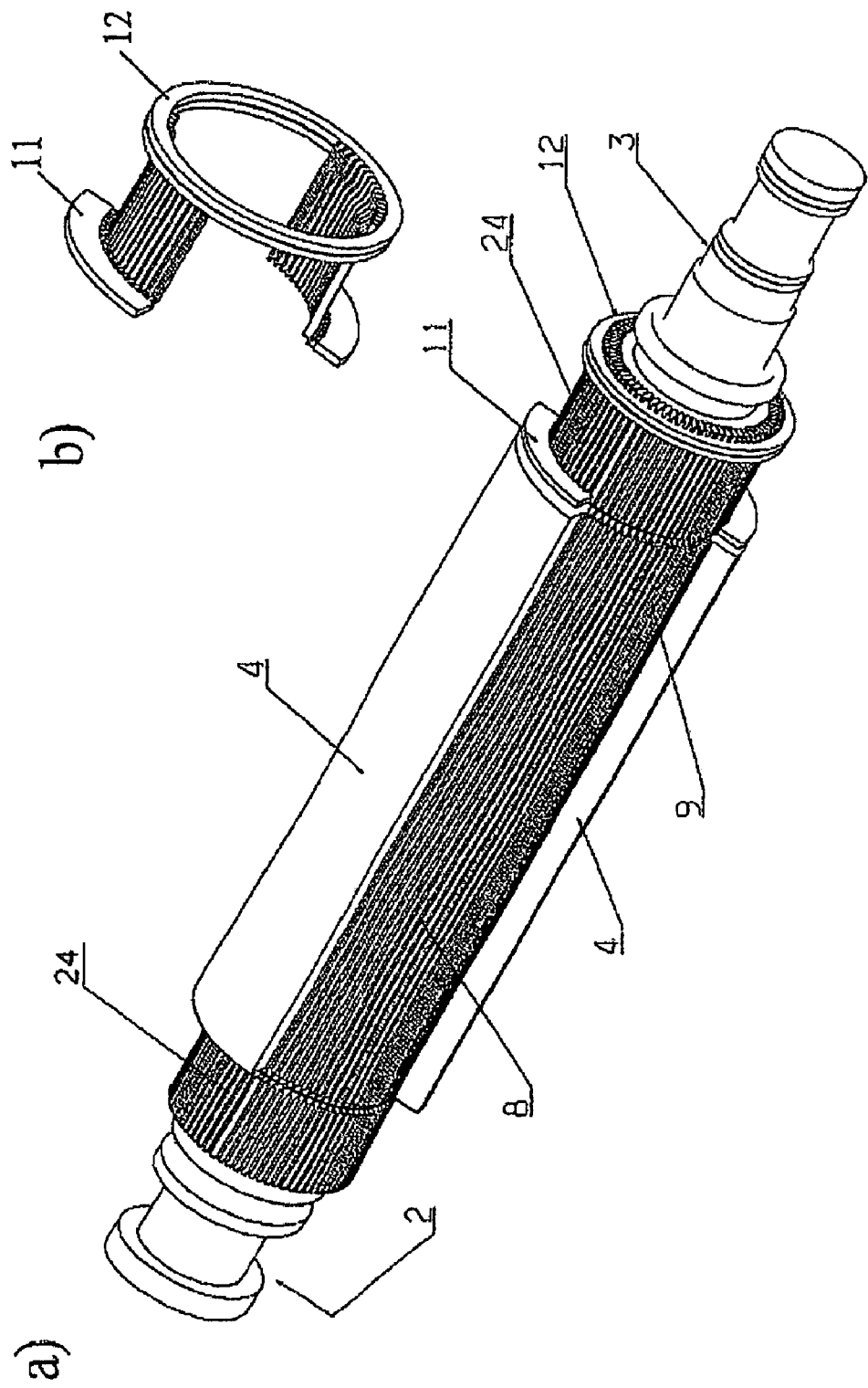
FIG. 3a) shows a perspective view of a rotor with the first end connection inserted; b) is a perspective view of the circular rings with the conductors connecting them to the end connections.

FIG. 3 shows a perspective view of a rotor core where the first axial conductor (not visible, hidden behind the upper conductor free portion 4) has been inserted into the first groove 9 right next to the conductor free portion 4. The connection between the axial conductors and the end connections is preferably realized by abutment of the top end of an axial conductor with a side surface of an end connection.

Additionally, the first end connection 11 has been inserted into the slots 24 in the non driven end terminal region 7 of the rotor. The first end connection 11 has an angular extension which on the one side (the side facing the viewer) aligns with the side of the conductor free portion 4, while on the other side (not visible) it allows the abutment of the end surface of the axial conductor with the lateral side surface of the end connection 11. The end connection 11 is provided with small protrusions on the inner radius, which fit into the grooves 24 and which fix the end connection 11 on the rotor core. Also visible in FIG. 3 are the circular rings 12, which are electrically connected to the turns of the conductors. In particular, one of the rings 12 is connected to the first end connection 11 by using conductors located in the deeper slots as mentioned above.

FIG. 3b) shows how the rings 12 are connected to the poles of the coils via conductors located in the deep grooves 25 to the end connections 11.

For additionally retaining the end connections with respect to centrifugal forces, it is possible to provide circumferential grooves on the peripheral side of the end connections, and to put circumferential retaining rings into these grooves after full assembly of the rotor. The retaining rings can be metal cables or also fibre reinforced polymeric strands, which may even be moulded into the grooves on-site by providing strands of reinforcing material (carbon fibres, glass fibres, aramid fibres etc.) and by adding matrix material.

The electrical and mechanical connection between the axial conductors and the end connections (both copper or aluminium), which conductors are both single conductors (no stack of conductors) which have a height corresponding approximately to the difference in radius between the conductor free portions 4 and the recesses 8 for the conductors, is provided by welding, pins, bolts or combinations thereof. In particular, a combination of pins with an electrically conducting glue can be used. The use of a glue allows much simpler assembly and provides a sufficient electrical connection between the conductors. Possible electrically conducting glues are listed in table 1.

Figure 4:
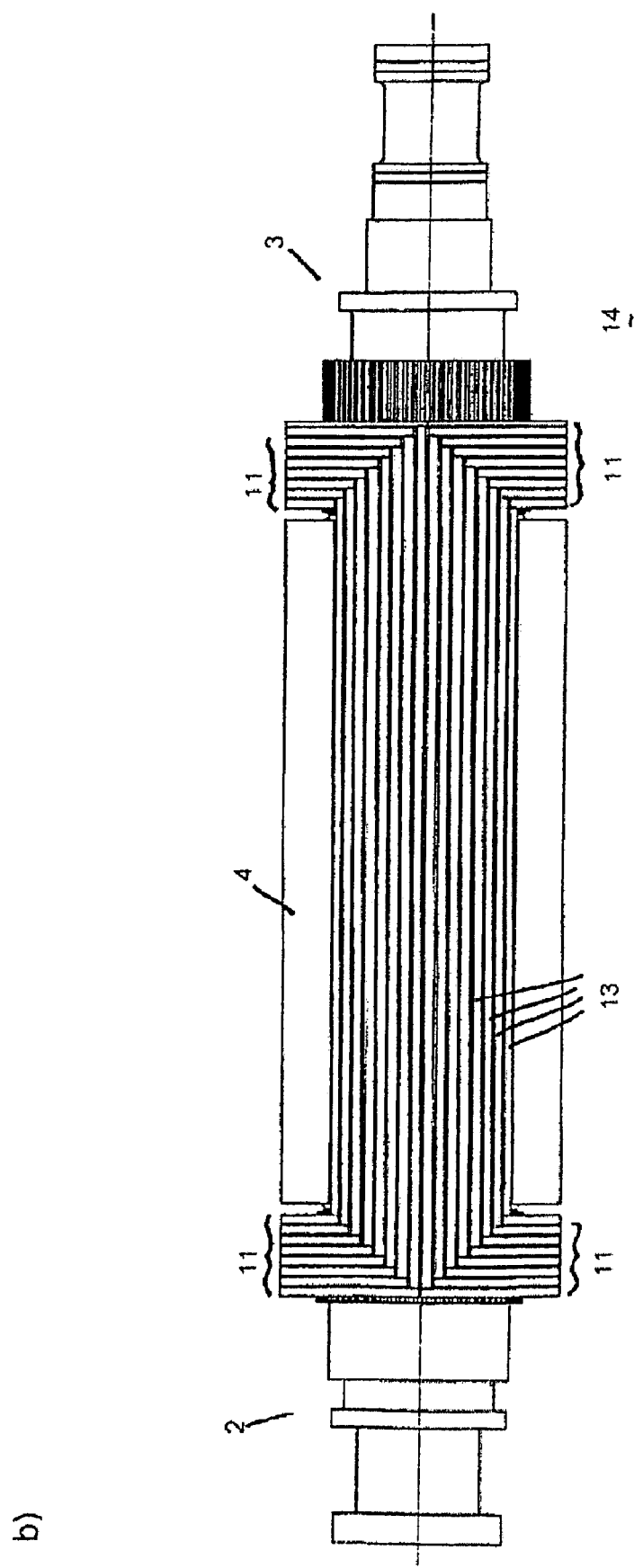
FIG. 4a) shows a perspective view of the rotor with all axial conductors and end connections inserted; b) is a side view of the rotor with all axial conductors and end connections inserted.
Figure 5:
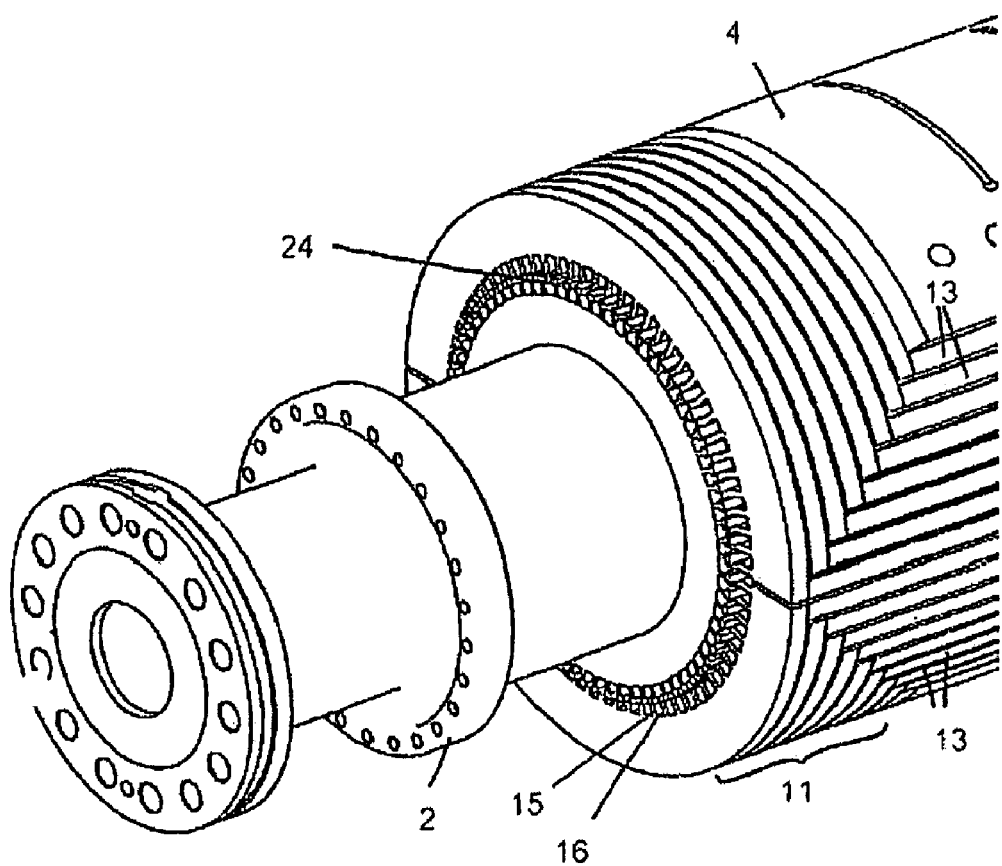
FIG. 5 shows a perspective view of a detail of FIG. 4.

FIG. 4a) shows a fully assembled rotor 14 in a perspective view and FIG. 4b) in a side view, where all the axial conductors 13 as well as all the end connections 11 are inserted. The tight packing of the conductors 11, 13 forming the turns around the conductor free portions 4 on both sides of the rotor can be seen. The individual conductors can be isolated with respect to each other by some kind of lacquer or insulating top layer, and in particular between the conductors, air gaps can be provided to allow circulation of cooling air in axial and/or radial direction. FIG. 5 shows a detailed perspective view of the driven end region 6.

On the non driven end 3 of the shaft (for an even number of turns, it would be on driving end 2 for odd numbers) there is one full 360° pole connecting ring 26, half in width because it creates two symmetrical paths. This is the connection which connects the mid-plane bars. This ring 26 makes the connection between the two poles of the rotor windings (FIG. 4a).

Figure 6:
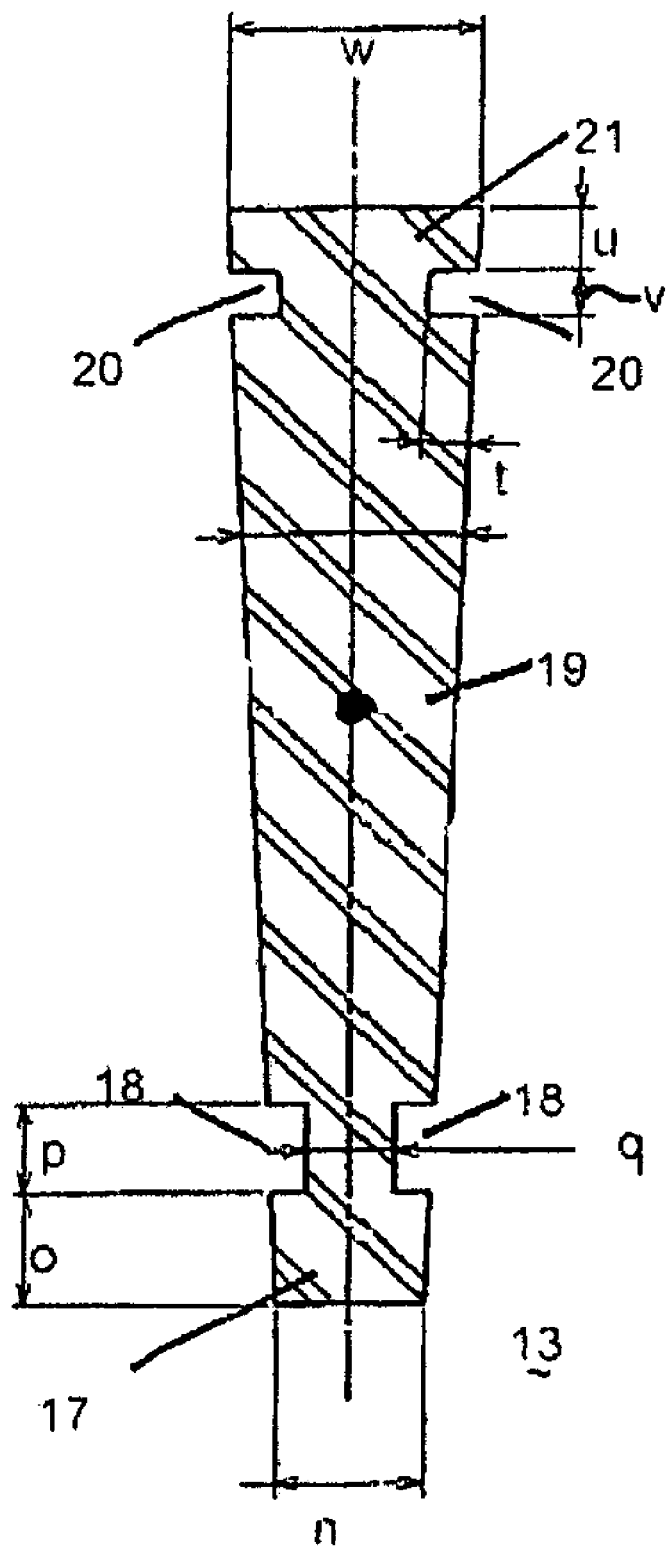
FIG. 6 shows an axial cut through an axial conductor.

FIG. 6 shows an axial cut through an axial conductor 13. The axial conductor is of conical shape, i.e. its width n on the inner side, on the side close to the central axis of the shaft, is 18.5 mm, while on the peripheral side, the width w is 31.3 mm. Spaced from the bottom by about o=15 mm, there is a recess 18 provided on both lateral sides of the conductor, to interact with the shoulders 10 of the rotor core. The recess 18 is located between the bottom part 17 and the middle part of 19 of the conductor 13. In radial direction these recesses have a width p of 12 mm, leaving a central massive width q of the conductor of 11 mm.

Between the middle part 19 and the top portion 21 of the conductor, there is an additional pair of recesses 20 on both lateral sides of the conductor 13. These recesses are distanced from the top of the conductor by u=8 mm and have a width v in radial direction of 6 mm. After the conductor 13 has been shifted in the axial direction into the rotor core or rather into the axial groove 9 of the rotor core, neighboring conductors are spaced from each other leaving an air gap extending in radial direction (see FIG. 7). To fix the individual axial conductors in circumferential direction with respect to each other, and to allow a controlled circulation of cooling air between individual, parallel conductors, axially extending wedges or bars 22 are shifted also from an axial direction between the conductors 13 using the grooves 20.

TABLE 1 conductive glues for connecting the conductors.

| Trade names | QMI 519 | AMICON CE 8501 | ECCOBOND 57 C | 3880 | AMICON C 860-4 |
|---|---|---|---|---|---|
| Supplier | LOCTITE | EMERSON δ CUMING | EMERSON δ CUMING | LOCTITE | EMERSON δ CUMING |
| Viscosity: (Pa · s) | (Thixotropic) 9 | 30 to 40 | viscous | 125 | 50 to 70 |
| Glass temperature (° C.) | 80 | / | / | 64 | ≧150° C. |
| Service temperature (° C.) | / | / | −60 to 120 | / | / |
| Appearance | epoxy one-component | epoxy one-component | epoxy two-component 1 to 1 (pot life 1 h) | epoxy one-component | epoxy one-component |
| Storage conditions | 12 month at −40° C. 24 h at 25° C. | 6 month at 0° C. 1 week at 25° C. | 12 month at 25° C. | between 0 and −20° C. | 6 month at 0° C. 3 month at 25° C. |

Figure 7:
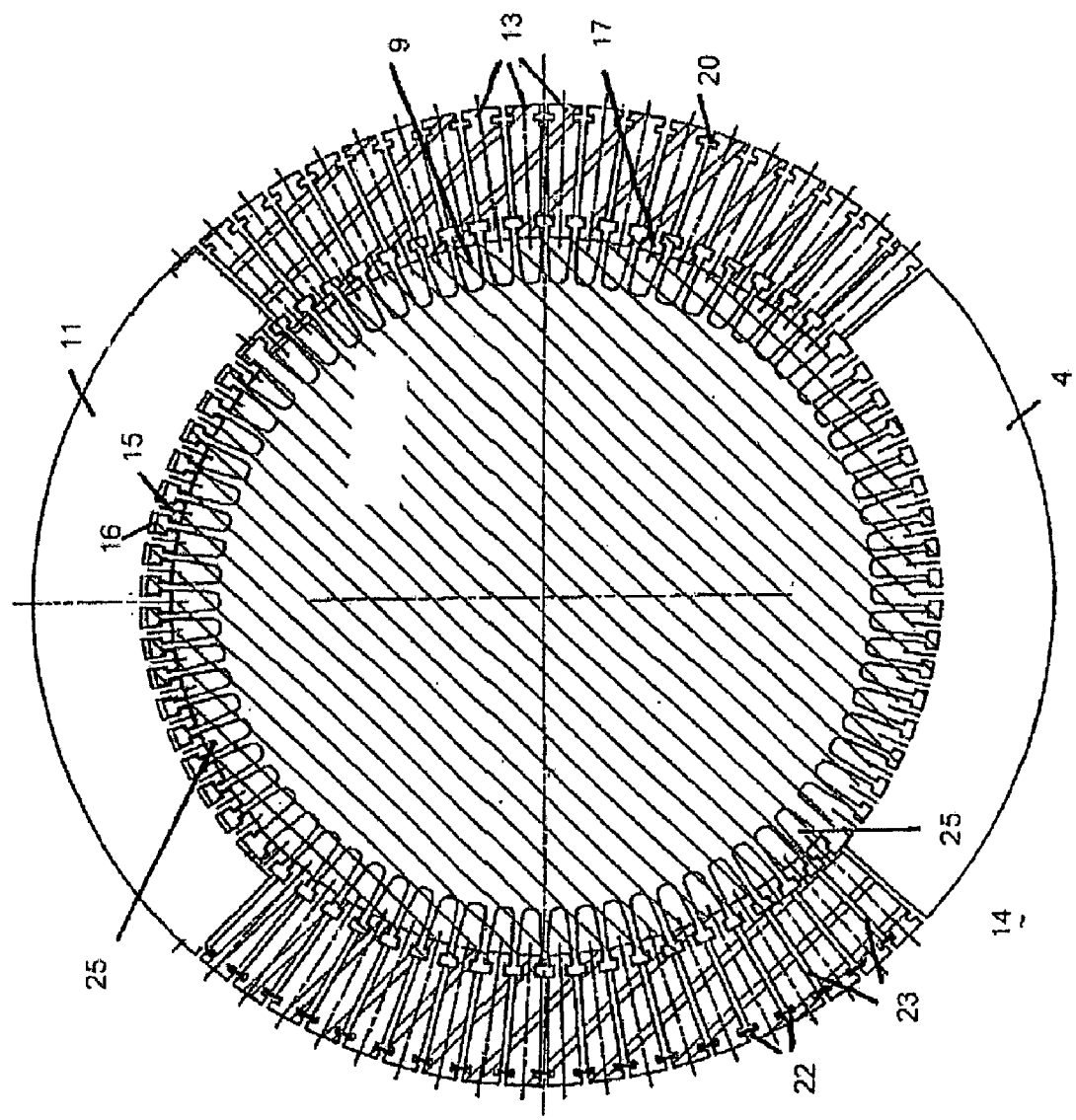
FIG. 7 shows an axial cut through the rotor with all axial conductors inserted and one end connection (top) inserted.

This is visualised in the left part of FIG. 7. The thus provided axial channels 23 between the conductors (and the conductor and the conductor free portion 4 of the rotor core at the border of the recesses 8) allows circulation of cooling air in axial direction. If the wedges 22 are additionally provided with holes in radial direction, the cooling air circulating in these axial channels can at least partially be redirected in radial direction.

In this particular case, the conductor 13 is not further structured, but it is possible to have axial cooling holes in the conductors to allow a central cooling of the conductor. Additionally it is possible to use such a rotor assembly for superconducting rotors.

Obviously, the shown 2-pole arrangement as described here is not restricting the scope of the idea. Also higher pole numbers can easily be realized.

What is claimed is:

1. A rotor for an electrical rotating machine comprising:
    a plurality of axial conductors;
    a rotor core having a plurality of axial grooves shaped to include a first element, and wherein the axial conductors are shaped to include a second element, wherein each of the axial conductors is disposed in and extends radially outward from one of the axial grooves, and wherein the first element and the second element interact to fix the axial conductors in the axial grooves with respect to centrifugal and torsional forces; and
    a third element disposed at a radially outward side of the axial conductors and between adjacent ones of the plurality of axial conductors and configured to keep the adjacent axial conductors at a predetermined distance and to stabilize the conductors in a circumferential direction, wherein a depth of the axial grooves is substantially smaller than a radial height of the axial conductors, wherein not more than one of the plurality of axial conductors is disposed in one of the plurality of axial grooves.

2. The rotor as recited in claim 1, wherein the first element includes shoulders extending along the axial grooves and the second element includes recesses in the axial conductors extending along the axial conductors.

3. The rotor as recited in claim 2, wherein the shoulders extend symmetrically on both sides and along substantially an entire length of the axial grooves and wherein the recesses extend symmetrically on both sides of the axial conductors.

4. The rotor as recited in claim 3, wherein the recesses extend symmetrically on both sides of a radial inner region of the axial conductors.

5. The rotor as recited in claim 1, wherein the first element includes a dove-tail shape in the rotor core and wherein the second element includes a corresponding dove-tail portion fitting into the dove-tail shape.

6. The rotor as recited in claim 1, wherein a radial height of the one axial conductor is substantially larger than a circumferential width of the one axial conductor.

7. The rotor as recited in claim 6, wherein the circumferential width of a radially inward side of the axial conductor is smaller than the circumferential width of a radially outward side of the axial conductor.

8. The rotor as recited in claim 1, wherein the axial conductors are capable of being shifted in the axial grooves in an axial direction of the rotor.

9. The rotor as recited in claim 1, wherein the third element includes a plurality of wedges configured to interact with second recesses in the axial conductors.

10. The rotor as recited in claim 9, wherein the plurality of wedges extend substantially along the length of the axial conductors and wherein axial channels are defined between the rotor core and the wedges to permit a circulation of cooling air.

11. The rotor as recited in claim 10, wherein the plurality of wedges include radial bores configured to allow a partial circulation of the cooling air in the radial direction.

12. The rotor as recited in claim 1, wherein the axial conductors include one of aluminium and copper.

13. The rotor as recited in claim 1, each of the axial conductors has a cross section in a range of 1000 to 4500 mm$^2$.

14. The rotor as recited in claim 1, wherein the rotor core includes conductor free portions around which the conductors are wound in at least one turn and terminal ends exterior to the conductor free portions and further comprising at least one end connection disposed on each of the terminal ends, wherein an axial portion of the at least one turn is formed by at least one of the axial conductors disposed in an axial groove and wherein a radial portion of the at least one turn is formed by at least one end connection, and wherein the end connections include a second element configured to interact with the first element to fix the end connections in the axial grooves with respect to centrifugal and torsional forces.

15. The rotor as recited in claim 14, wherein the terminal ends include further axial grooves including shoulders, and wherein the end connections include corresponding recesses extending perpendicularly to a main direction of the end connections.

16. The rotor as recited in claim 14, wherein each of the end connections is a single conductor having a same height as each of the axial conductors, and wherein a radial height of each of the end connections is substantially larger than an axial width of each of the end connections.

17. The rotor as recited in claim 14, wherein the end connections are conductively connected to the axial conductors using at least one of pins, bolts, welding, brazing, and gluing.

18. The rotor as recited in claim 14, wherein the end connections are capable of being shifted into the rotor core into the axial grooves in an axial direction of the rotor.

19. A rotor for an electrical rotating machine comprising:
    a plurality of axial conductors; and
    a rotor core having a plurality of axial grooves shaped to include a first element, and wherein the axial conductors are shaped to include a second element, wherein each of the axial conductors is disposed in and extends radially outward from one of the axial grooves, and wherein the first element and the second element interact to fix the axial conductors in the axial grooves with respect to centrifugal and torsional forces, the axial grooves being at least partially deeper than foot portions of the axial conductors so as to define subslots beneath the axial conductors.

20. The rotor as recited in claim 19, wherein not more than one of the plurality of axial conductors is disposed in one of the plurality of axial grooves.

21. The rotor as recited in claim 19, further comprising a third element disposed at a radially outward side of the axial conductors and between adjacent ones of the plurality of axial conductors and configured to keep the adjacent axial conductors at a predetermined distance and to stabilize the conductors in a circumferential direction, wherein a depth of the axial grooves is substantially smaller than a radial height of the axial conductors.

22. A rotor for an electrical rotating machine comprising:
a plurality of axial conductors; and
a rotor core having a plurality of axial grooves shaped to include a first element, wherein the axial conductors are shaped to include a second element, wherein each of the axial conductors is disposed in and extends radially outward from one of the axial grooves, and wherein the first element and the second element interact to fix the axial conductors in the axial grooves with respect to centrifugal and torsional forces,
wherein the rotor core includes conductor free portions around which the conductors are wound in at least one turn and terminal ends exterior to the conductor free portions and further comprising at least one end connection disposed on each of the terminal ends,
wherein an axial portion of the at least one turn is formed by at least one of the axial conductors disposed in an axial groove and
wherein a circumferential portion of the at least one turn is formed by at least one end connection, and wherein the end connections include second elements configured to interact with the first elements to fix the end connections in additional axial grooves, said additional axial grooves being provided in the rotor core on the terminal ends exterior to the conductor free portions, with respect to centrifugal and torsional forces.

23. The rotor as recited in claim 22, wherein the terminal ends include a plurality of further axial grooves including shoulders, and wherein the end connections include a plurality of corresponding recesses extending perpendicularly to a main direction of the end connections.

* * * * *